United States Patent
Yin et al.

(10) Patent No.: US 7,933,346 B2
(45) Date of Patent: Apr. 26, 2011

(54) BASE STATION AND METHOD FOR MITIGATING INTERFERENCE IN A SECTORIZED COMMUNICATION NETWORK

(75) Inventors: Hujun Yin, San Jose, CA (US); Roshni M Srinivasan, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 664 days.

(21) Appl. No.: 11/616,618

(22) Filed: Dec. 27, 2006

(65) Prior Publication Data

US 2008/0159417 A1    Jul. 3, 2008

(51) Int. Cl.
*H04K 1/10* (2006.01)
*H04L 27/28* (2006.01)
*H04L 27/00* (2006.01)
*H04J 11/00* (2006.01)
*H04B 7/216* (2006.01)

(52) U.S. Cl. ......... 375/260; 375/259; 370/208; 370/335

(58) Field of Classification Search ........... 375/259, 375/260; 327/100
See application file for complete search history.

(56) References Cited

U.S. PATENT DOCUMENTS

| 6,947,748 | B2 | 9/2005 | Li et al. | |
|---|---|---|---|---|
| 7,564,925 | B2* | 7/2009 | Bisson et al. | 375/316 |
| 2007/0230405 | A1* | 10/2007 | Yin et al. | 370/335 |
| 2008/0032630 | A1* | 2/2008 | Kim et al. | 455/45 |
| 2008/0101307 | A1* | 5/2008 | Sindhushayana et al. | 370/337 |
| 2008/0144643 | A1* | 6/2008 | Berg | 370/401 |
| 2008/0188234 | A1* | 8/2008 | Gorokhov et al. | 455/452.2 |

FOREIGN PATENT DOCUMENTS

| EP | 1592192 A2 | 11/2005 |
|---|---|---|
| WO | WO-2008082833 A1 | 7/2008 |

OTHER PUBLICATIONS

International Application Serial No. PCT/US2007/086191 Search Report mailed May 19, 2008, 3 pgs.
International Application Serial No. PCT/US2007/086191 Written Opinion mailed May 19, 2008, P237, 4 pgs.
Gang, D., et al., A Downlink Radio Resource Allocation Algorithm Based on Inter-Cell Interference Mitigation for Multi-Cell OFDMA System, *In: Communication and Networking in China*, (Oct. 2006), 1-5.
Ko, S. J, et al., Aggressive Subchannel Allocation Algorithm for Optimize Transmission Efficiency Among Users in Multiuser OFDMA System, *Korea Institute of Communication Sciences*, 31 (6A), (Jun. 2006), 617-626.
Yin, Hujun , et al., "Techniques to Provide Physical Resource Allocation Using a Tree-Based Structure and Communicate a Channel Quality Indicator", U.S. Appl. No. 11/562,498, filed Nov. 22, 2006.

* cited by examiner

*Primary Examiner* — David C Payne
*Assistant Examiner* — Erin M File
(74) *Attorney, Agent, or Firm* — Schwegman, Lundberg & Woessner, P.A.; Gregory J. Gorrie

(57) ABSTRACT

Embodiments of a base station and method for mitigating interference in a sectorized wireless communication network are generally described herein. Other embodiments may be described and claimed. In some embodiments, some partitions of subchannels are configured in accordance with the distributed subcarrier permutation scheme for use within each sector of a base station, and one or more partitions of subchannels is configured in accordance with the contiguous subcarrier scheme for use within each sector of the base station.

13 Claims, 3 Drawing Sheets

SECTORIZED WIRELESS COMMUNICATION NETWORK

SECTORIZED WIRELESS COMMUNICATION NETWORK

BASE STATION AND METHOD FOR MITIGATING INTERFERENCE IN A SECTORIZED COMMUNICATION NETWORK

TECHNICAL FIELD

The present invention pertains to wireless communications. Some embodiments pertain to broadband wireless access (BWA) networks, such as a Worldwide Interoperability for Microwave Access (WiMax) network. Some embodiments pertain to wireless communication networks operating in accordance with the 32rd Generation Partnership Project (3GPP) including the Long Term Evolution (LTE) of the 3GPP.

BACKGROUND

Many wireless communication networks implement various forms of frequency reuse schemes to maximize capacity while minimizing interference. For example, some communication networks use orthogonal sets of channels in neighboring sectors to mitigate interference. This scheme, however, reduces the network capacity significantly because the entire network bandwidth is not available for use in all sectors.

Thus, there are general needs for methods for mitigating interference while increasing capacity in wireless communication networks.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
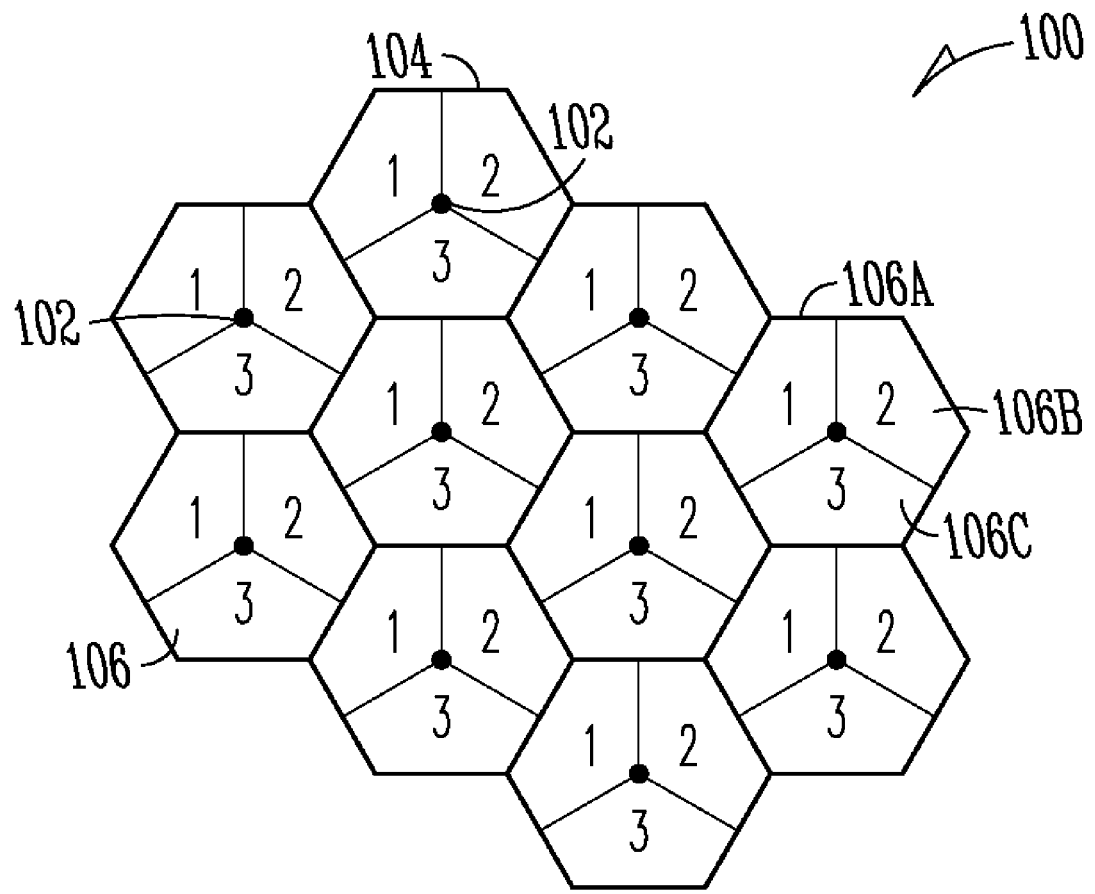
FIG. 1 illustrates a sectorized wireless communication network in accordance with some embodiments of the present invention.

FIG. 1 illustrates a sectorized wireless communication network in accordance with some embodiments of the present invention. Sectorized wireless communication network 100 comprises a plurality of base stations 102, each of which may serve subscriber stations within an associated cell 104. Each cell 104 may be divided into a number of sectors 106. In the example illustrated in FIG. 1, each cell 104 is divided into three sectors; sectors 106A, 106B and 106C and labeled with numbers 1, 2, and 3 respectively. Base stations are represented by dark circles at the center of the hexagonal cells. Although sectorized wireless communication network 100 is illustrated with base stations 102 providing communication services within three sectors, the scope of the invention is not limited in this respect as the number of sectors N may range from as few as three to as great as ten or more.

In accordance with some embodiments of the present invention, each base station 102 may configure some partitions of subchannels in accordance with a distributed subcarrier permutation scheme for use within each sector, and may configure the remaining one or more partitions of subchannels in accordance with the contiguous subcarrier scheme for use within each sector. In some embodiments with four sectors, two partitions may be configured in accordance with a distributed subcarrier permutation scheme and the other two partitions may be configured in accordance with the contiguous subcarrier scheme, although the scope of the invention is not limited in this respect. In these embodiments, one or more partitions of subchannels may be configured in accordance with the distributed subcarrier permutation scheme, and one or more partitions of subchannels may be configured in accordance with the contiguous subcarrier scheme. In some embodiments, the number of partitions of subchannel may correspond to the number of sectors, although the scope of the invention is not limited in this respect.

In accordance with some embodiments, each base station 102 may configure N−1 partitions of subchannels in accordance with the distributed subcarrier permutation scheme for use within each sector. In these embodiments, each base station 102 may also configure a single partition of subchannels in accordance with the contiguous subcarrier scheme for use within each sector.

In these embodiments, the subchannels configured in accordance with the distributed subcarrier permutation scheme may utilize the same frequency subcarriers as the subchannels configured in accordance with the contiguous subcarrier scheme in different sectors. The use of a contiguous subcarrier scheme and a distributed subcarrier permutation scheme may reduce interference between sectors while allowing the full network bandwidth to be utilized in each sector. These embodiments are discussed in more detail below.

In some embodiments, network 100 may communicate in accordance with an orthogonal frequency division multiple access (OFDMA) technique. As used herein, the term 'subchannel' refers to a basic unit of frequency allocation and may comprise a group of frequency subcarriers. In some 3GPP embodiments, a subchannel may be equivalent to a frequency chunk, although the scope of the invention is not limited in this respect.

Figure 2:
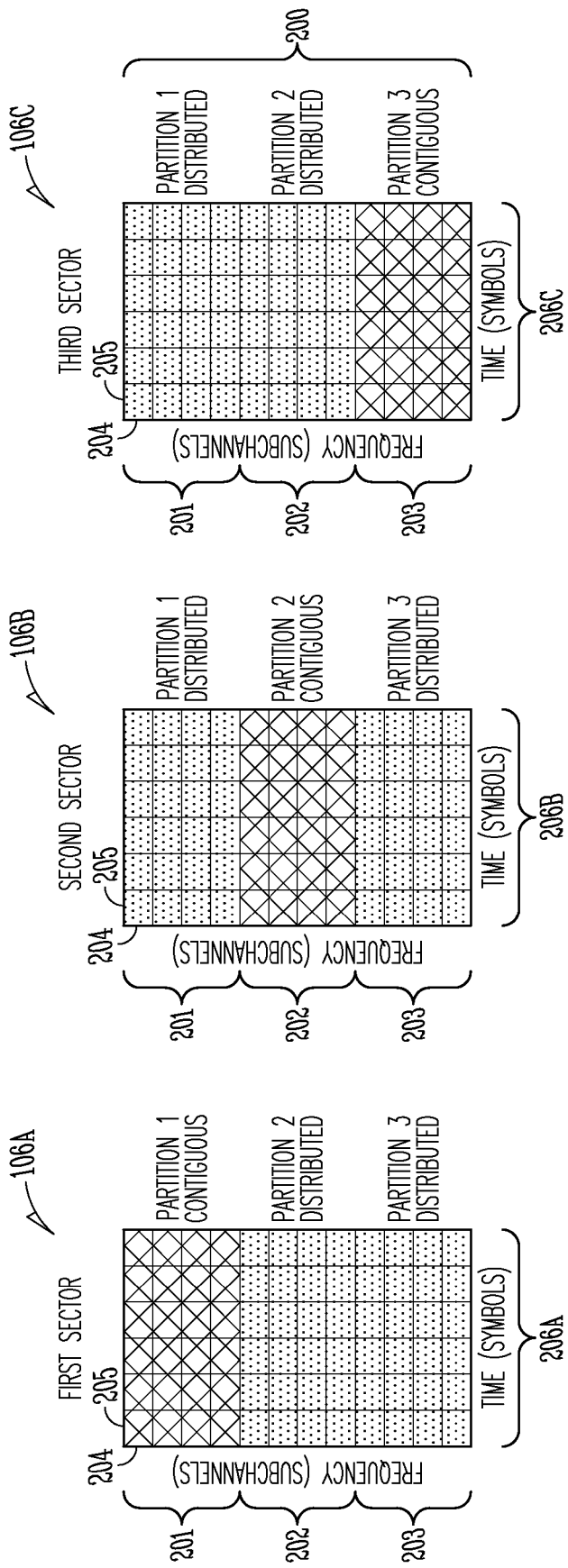
FIG. 2 illustrates a channelization scheme for interference mitigation in accordance with some embodiments of the present invention.

FIG. 2 illustrates a channelization scheme for interference mitigation in accordance with some embodiments of the present invention. FIG. 2 illustrates a channelization scheme for embodiments that utilize three sectors (i.e., N=3). In these embodiments, each base station 102 (FIG. 1) may transmit first group of symbols 206A in first sector 106A concurrently with second group of symbols 206B in second sector 106B and third group of symbols 206C in third sector 106C, although the scope of the invention is not limited in this respect. In FIG. 2, OFDMA symbol 205 is illustrated as a column of boxes and subchannels 204 are illustrated as a row of boxes. Each box may represent a time and frequency component of the transmitted signals.

In accordance with some embodiments, network bandwidth 200 may be partitioned into partitions of subchannels 204, illustrated as first partition 201, second partition 202, and third partition 203. A greater or lesser number of partitions may be used. In accordance with some embodiments, each sector may have one or more partitions of subchannels configured in accordance with the contiguous subcarrier scheme (illustrated with crosshatching). In these embodiments, a different partition of subchannels may be configured in accordance with the contiguous subcarrier scheme in each sector of the base station. For example, first partition 201 is configured in accordance with the contiguous subcarrier scheme in first sector 106A, second partition 202 is configured in accordance with the contiguous subcarrier scheme in second sector 106B, and third partition 203 is configured in accordance with the contiguous subcarrier scheme in third sector 106C. The other partitions of subchannels may be configured in accordance with the distributed subcarrier permutation scheme (illustrated with small dots).

In these embodiments, the one or more partitions of subchannels configured in accordance with the contiguous subcarrier scheme in one sector may utilize interfering subcarriers and may experience randomized interference with subcarriers with the partitions of subchannels configured in accordance with the distributed subcarrier permutation scheme in other sectors. Furthermore, the partitions of subchannels of each sector configured in accordance with the distributed subcarrier permutation scheme may utilize interfering subcarriers with different sectors.

As illustrated in FIG. 2, in first sector 106A, first partition 201 has subchannels 204 configured in accordance with the contiguous subcarrier scheme, second partition 202 has subchannels 204 configured in accordance with the distributed subcarrier permutation scheme, and third partition 203 has subchannels 204 configured in accordance with the distributed subcarrier permutation scheme. In second sector 106B, first partition 201 has subchannels 204 configured in accordance with the distributed subcarrier permutation scheme, second partition 202 has subchannels 204 configured in accordance with the contiguous subcarrier scheme, and third partition 203 has subchannels 204 configured in accordance with the distributed subcarrier permutation scheme. In third sector 106C, first partition 201 has subchannels 204 configured in accordance with the distributed subcarrier permutation scheme, second partition 202 has subchannels 204 configured in accordance with the distributed subcarrier permutation scheme, and third partition 203 has subchannels 204 configured in accordance with the contiguous subcarrier scheme.

In some embodiments, each sector may have some partitions of subchannels (e.g., N−1 partitions, N−2 partitions, etc.) configured in accordance with the distributed subcarrier permutation scheme and the remaining one or more partitions of subchannels configured in accordance with the contiguous subcarrier scheme. In these embodiments, the first, second and third partitions of network bandwidth 200 may comprise the entire bandwidth of the network, although the scope of the invention is not limited in this respect. In some embodiments, each base station 102 (FIG. 1) may configure subchannels within sectors on a network level as illustrated in FIG. 1.

In some embodiments, each base station 102 (FIG. 1) may concurrently transmit OFDMA symbol 205 in each sector. The OFDMA symbol transmitted in each sector may be transmitted in accordance with the partitions of subchannels configured in accordance with the distributed subcarrier permutation scheme and the one or more partitions of subchannels configured in accordance with the contiguous subcarrier scheme. In these embodiments, separate OFDMA symbols may be concurrently transmitted in different sectors. As illustrated in FIG. 2, in any particular sector, the same OFDMA symbol 205 may have some partitions of subchannels 204 configured in accordance with the distributed subcarrier permutation scheme and other partitions of subchannels 204 configured in accordance with the contiguous subcarrier scheme.

In some embodiments, base station 102 (FIG. 1) may assign subchannels to subscriber stations based on a channel quality indicator (CQI) received from the subscriber stations. In these embodiments, subscriber stations with faster changing channel quality may be assigned subchannels configured in accordance with the distributed subcarrier permutation scheme, and subscriber stations with slower changing channel quality may be assigned subchannels configured with the contiguous subcarrier scheme, although the scope of the invention is not limited in this respect.

In some embodiments, base station 102 (FIG. 1) may assign subchannels to subscriber stations based on a mobility factor of the subscriber stations. In these embodiments, subscriber stations with higher mobility may be assigned subchannels configured in accordance with the distributed subcarrier permutation scheme, and subscriber stations with lower mobility may be assigned subchannels configured with the contiguous subcarrier scheme. In these embodiments, the distributed subcarrier permutation scheme may be used for higher speed subscriber stations and/or faster changing channel conditions, while the contiguous subcarrier scheme may be used for lower speed or stationary subscriber stations or more slowly changing channel conditions. In some embodiments, the mobility factor may be determined by a Doppler frequency estimate (which may be a direct estimate of mobility), channel quality variation (e.g., determined from the CQI) and/or packet error statistics (which may be indirect estimates of mobility) of a subscriber station. The mobility factor for a subscriber station may be determined by other techniques as well.

In some embodiments, each subchannel 204 configured in accordance with the contiguous subcarrier scheme may comprise a contiguous block of adjacent frequency subcarriers. Each subchannel 204 configured in accordance with the distributed subcarrier permutation scheme may comprise a logical subchannel of non-contiguous frequency subcarriers. In some WiMax embodiments, partitions of subchannels 204 configured in accordance with the distributed subcarrier permutation may be suitable for partially used subcarrier (PUSC) allocation schemes and/or fully-utilized subcarrier (FUSC) allocation schemes, while partitions of subchannels 204 configured in accordance with the contiguous subcarrier scheme may be suitable for adaptive modulation and coding (AMC) subcarrier allocation schemes, although the scope of the invention is not limited in this respect.

In some embodiments, the number of subchannels configured in accordance with the contiguous subcarrier scheme and the number of subchannels configured in accordance with the distributed subcarrier permutation scheme may be varied based on a number of subscriber stations with higher mobility and a number of subscriber stations with lower mobility. In these embodiments, for greater numbers of higher-mobility subscriber stations, more subchannels may be configured in accordance with the distributed subcarrier permutation scheme. For greater numbers of lower-mobility subscriber stations, more subchannels may be configured in accordance with the contiguous subcarrier scheme.

In some embodiments, the non-contiguous frequency subcarriers of the subchannels configured in accordance with the distributed subcarrier permutation scheme may comprise either pseudo-random distributed frequency subcarriers or subcarriers permuted in accordance with a predetermined pattern. In some embodiments, the subcarriers of the subchannels configured in accordance with the distributed subcarrier permutation scheme may be distributed substantially evenly across a partition of network bandwidth 200, although the scope of the invention is not limited in this respect.

In these embodiments, the distributed subcarrier permutation scheme may help maximize frequency diversity and may help randomize inter-cell interference. In this way, the distributed subcarrier permutation scheme may be more robust for a mobile cellular environment where channel characteristics change fast. In these embodiments, the contiguous subcarrier scheme may facilitate frequency-selective scheduling and may be suitable for more stable channel conditions where the channel characteristics change slower.

Figure 3:
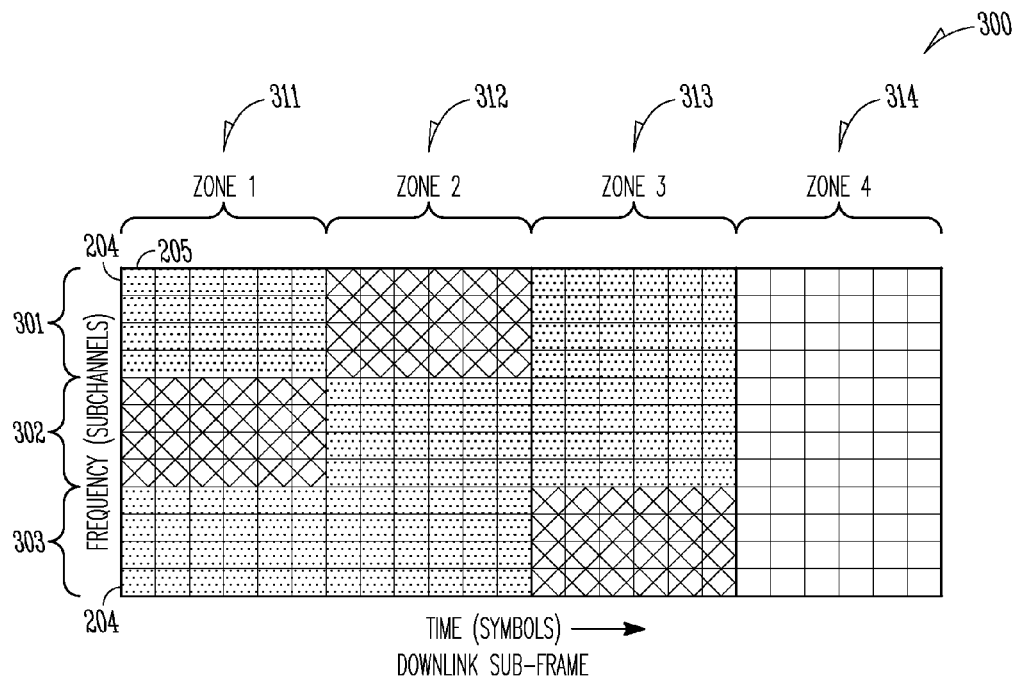
FIG. 3 illustrates a portion of a downlink subframe in accordance with some embodiments of the present invention.

FIG. 3 illustrates a portion of a downlink subframe in accordance with some embodiments of the present invention. In these embodiments, each base station 102 (FIG. 1) may concurrently transmit downlink subframes, such as downlink subframe 300, within each sector. Each downlink subframe 300 may comprise a plurality of zones, illustrated as zones 311, 312, 313, comprising groups of OFDMA symbols 205. Subchannels 204 may be partitioned into a plurality of partitions, illustrated as partitions 301, 302, and 303. Partitions 301, 302 and 303 may correspond respectively to partitions 201, 202 and 203 (FIG. 2). In these embodiments, one or more partitions of subchannels may be configured in accordance with the contiguous subcarrier scheme (illustrated with crosshatching) within each zone, and the other partitions of subchannels may be configured in accordance with the distributed subcarrier permutation scheme (illustrated with small dots) within each zone. For example, partition 302 may be configured in accordance with the contiguous subcarrier scheme in first zone 311, partition 301 may be configured in accordance with the contiguous subcarrier scheme in second zone 312, and partition 303 may be configured in accordance with the contiguous subcarrier scheme in third zone 313, although the scope of the invention is not limited in this respect.

The use of a single partition of subchannels configured in accordance with the contiguous subcarrier scheme within each zone of downlink subframe 300 and the use of other subchannels configured in accordance with the distributed subcarrier permutation scheme in the other partitions allows base stations 102 (FIG. 1) of network 100 (FIG. 1) to provide a contiguous subcarrier permutation over all subcarriers within each subframe. This may help exploit any frequency-selective scheduling gain while randomizing any interference because the neighboring sectors may be configured in accordance with the distributed subcarrier permutation scheme.

In some embodiments, downlink subframe 300 may comprise an additional zone, such as additional zone 314. In these embodiments, all subchannels in additional zone 314 may be configured in accordance with either the contiguous subcarrier scheme or the distributed subcarrier permutation scheme. In these embodiments, additional zone 314 does not have subchannels partitioned into partitions 301, 302, and 303. All subchannels 204 of additional zone 314 may be configured with the same scheme, although the scope of the invention is not limited in this respect. In some embodiments, subchannels 204 of additional zone 314 may be configured in accordance with either the contiguous subcarrier scheme or the distributed subcarrier permutation scheme based on the requirements of the data to be transmitted to subscriber stations within downlink subframe 300, although the scope of the invention is not limited in this respect. In this way either contiguous or distributed subchannels may be provided across all frequency subcarriers.

Figure 4:
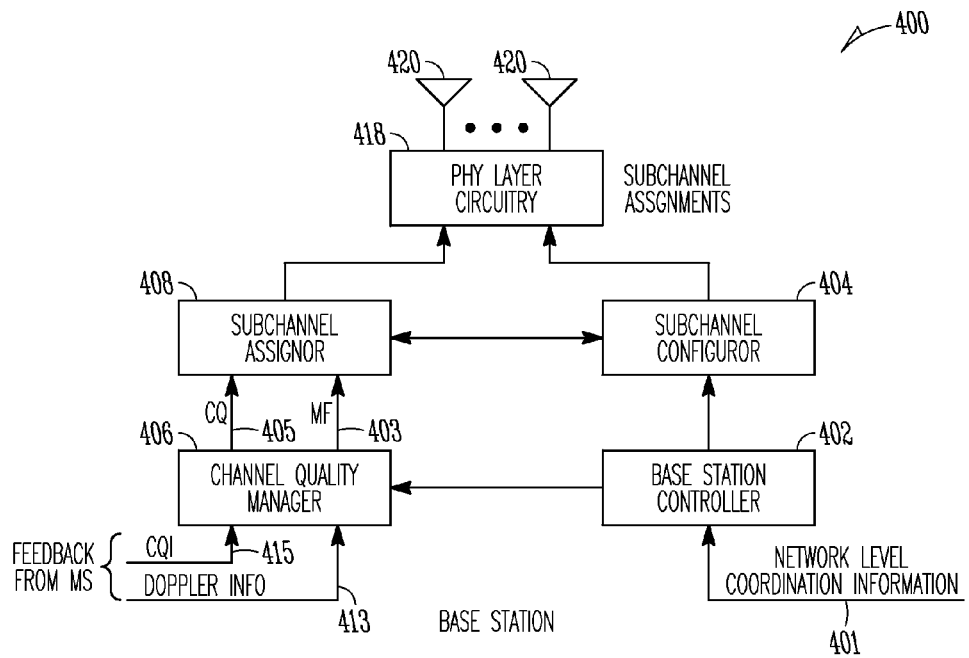
FIG. 4 is block diagram of a base station in accordance with some embodiments of the present invention.

FIG. 4 is block diagram of a base station in accordance with some embodiments of the present invention. Base station 400 may be suitable for use of any one or more of base stations 102 (FIG. 1). In some embodiments, base station 400 may comprise subchannel configuror 404 to configure a plurality of partitions of subchannels in accordance with the distributed subcarrier permutation scheme for use within each sector and to configure one or more partitions of subchannels in accordance with the contiguous subcarrier scheme for use within each sector. As discussed above, a different partition of subchannels may be configured in accordance with the contiguous subcarrier scheme in each sector of the base station.

In some embodiments, base station 400 may also comprise subchannel assignor 408 to assign subchannels to subscriber stations based on channel quality (CQ) 405. Channel quality 405 may be determined by channel quality manager 406 based on CQI 415, which may be received from the subscriber stations. In these embodiments, subscriber stations with faster changing channel quality may be assigned subchannels configured in accordance with the distributed subcarrier permutation scheme and subscriber stations with slower changing channel quality may be assigned subchannels configured with the contiguous subcarrier scheme, although the scope of the invention is not limited in this respect.

In some embodiments, subchannel assignor 408 may assign subchannels to subscriber stations based on mobility factor (MF) 403 associated with the subscriber stations. In these embodiments, subscriber stations with higher mobility may be assigned subchannels configured in accordance with the distributed subcarrier permutation scheme and subscriber stations with lower mobility may be assigned subchannels configured with the contiguous subcarrier scheme. Mobility factor 403 may be determined by Doppler frequency estimate 413, channel quality variation, and/or packet error statistics of a subscriber station.

Base station 400 may also comprise physical (PHY) layer circuitry 418 to concurrently transmit downlink subframes within each sector using antennas 420 based on the subchannel configuration provided by subchannel configuror 404 and/or the subchannel assignments provided by subchannel assignor 408. In some embodiments, this information may be provided in the form of a downlink map for transmitting as part of the downlink subframe, although the scope of the invention is not limited in this respect.

In some embodiments, base station 400 may also comprise base station controller 402 for coordinating subchannel partitions with other base stations of a sectorized communication network, such as network 100 (FIG. 1). In this way, the base stations 102 (FIG. 1) of network 100 may configure sectors 106A, 106B and 106C (FIG. 1) at the network level to provide for synchronous transmissions by each base station 102 (FIG. 1). In these embodiments, base station controller 402 may receive network level coordination information 401 from one or more other base stations or a network-level controller, although the scope of the invention is not limited in this respect.

Antennas 420 may comprise one or more directional or omnidirectional antennas, including, for example, dipole antennas, monopole antennas, patch antennas, loop antennas, microstrip antennas, or other types of antennas suitable for transmission of radio-frequency (RF) signals. In some embodiments, instead of two or more antennas, a single antenna with multiple apertures may be used. In these embodiments, each aperture may be considered a separate antenna. Base station 400 may employ a separate antenna or a separate set of antennas 420 for use within each sector.

Although base station 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of base station 400 may refer to one or more processes operating on one or more processing elements.

In some embodiments, base station 400 may transmit OFDM communication signals over a multicarrier communication channel. The multicarrier communication channel may be within a predetermined frequency spectrum and may comprise a plurality of orthogonal subcarriers. In some embodiments, the OFDM signals may be defined by closely spaced OFDM subcarriers.

In some other embodiments, base station 400 may be a cellular communication station operating in accordance with the third generation (3G) or fourth generation (4G) communication standards. In some embodiments, base station 400 may operate in accordance with the 3GPP, the 3GPP LTE, and/or the 3GPP2 Air Interface Evolution (AIE).

In some embodiments, base station 400 may be a WiMax or BWA network communication station, although the scope of the invention is not limited in this respect as base station 400 may be part of almost any wireless communication device. In some embodiments, base station 400 may communicate in accordance with specific communication standards, such as the Institute of Electrical and Electronics Engineers (IEEE) standards including the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

In some embodiments, subscriber stations may be a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wire lessly.

Some embodiments may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for communicating in an orthogonal frequency division multiple access (OFDMA) network comprising:
configuring partitions of subchannels of a plurality of partitions for use in sectors of a base station such that each sector has one partition of subchannels configured in accordance with a contiguous subcarrier permutation scheme and each sector has remaining partitions of subchannels configured in accordance with a distributed subcarrier permutation scheme,
wherein the one partition of subchannels of each sector that is configured in accordance with the contiguous subcarrier permutation scheme comprises a different partition of subchannels for each of the sectors; and
concurrently transmitting on the subchannels configured in accordance with the distributed subcarrier permutation scheme and the subchannels configured in accordance with the contiguous subcarrier permutation scheme,
wherein subcarriers of subchannels configured in accordance with the contiguous subcarrier permutation scheme experience randomized interference with subcarriers of subchannels configured in accordance with the distributed subcarrier permutation scheme in different sectors,
wherein the partitions of subchannels configured in accordance with the distributed subcarrier permutation scheme utilize interfering subcarriers in different sectors, and
wherein the partitions of subchannels configured in accordance with the distributed subcarrier permutation scheme are operable in either PUSC or FUSC modes.

2. The method of claim 1 wherein configuring subchannels in accordance with the distributed subcarrier permutation scheme comprises configuring N−1 partitions of subchannels in accordance with the distributed subcarrier permutation scheme for use within each sector of the base station, and
wherein configuring subchannels in accordance with the contiguous subcarrier permutation scheme comprises configuring a single partition of subchannels in accordance with the contiguous subcarrier permutation scheme for use within each sector of the base station,
wherein N corresponds to a number of sectors provided by the base station and ranges between three and ten inclusive.

3. The method of claim 2 wherein the base station concurrently transmits downlink subframes within each sector,
wherein each downlink subframe comprises a plurality of zones comprising groups of OFDMA symbols,
wherein the method further comprises:
configuring a single partition of the subchannels in accordance with the contiguous subcarrier permutation scheme within each zone; and
configuring the remaining partitions of the subchannels in accordance with the distributed subcarrier permutation scheme within each zone.

4. The method of claim 3 wherein the downlink subframe comprises an additional zone, and
wherein the method further comprises configuring all subchannels in the additional zone in accordance with either the contiguous subcarrier permutation scheme or the distributed subcarrier permutation scheme.

5. The method of claim 2 wherein each subchannel configured in accordance with the contiguous subcarrier permutation scheme comprises a contiguous block of adjacent frequency subcarriers, and
wherein each subchannel configured in accordance with the distributed subcarrier permutation scheme comprises a logical subchannel of non-contiguous frequency subcarriers.

6. The method of claim 2 wherein the base station is one of a plurality of base stations of the OFDMA network,
wherein base stations with adjacent sectors configure partitions of subchannels for use within their sectors in accordance with either the distributed subcarrier permutation scheme or the contiguous subcarrier permutation scheme, and
wherein adjacent sectors of different base stations are configured to use different partitions of subchannels configured in accordance with the contiguous subcarrier permutation scheme.

7. The method of claim 1 further comprising concurrently transmitting an OFDMA symbol in each sector,
wherein the OFDMA symbol transmitted in each sector comprises some partitions of subchannels configured in accordance with the distributed subcarrier permutation scheme and one or more partitions of subchannels configured in accordance with the contiguous subcarrier permutation scheme.

8. A base station comprising:
a subchannel configuror to configure partitions of subchannels of a plurality of partitions for use in sectors of the base station such that each sector has one partition of subchannels configured in accordance with a contiguous subcarrier permutation scheme and each sector has remaining partitions of subchannels configured in accordance with a distributed subcarrier permutation scheme, wherein the one partition of subchannels of each sector that is configured in accordance with the contiguous subcarrier permutation scheme comprises a different partition of subchannels for each of the sectors; and
physical layer circuitry to concurrently transmit on the subchannels configured in accordance with the distributed subcarrier permutation scheme and the subchannels configured in accordance with the contiguous subcarrier permutation scheme,
wherein subcarriers of subchannels configured in accordance with the contiguous subcarrier permutation scheme experience randomized interference with subcarriers of subchannels configured in accordance with the distributed subcarrier permutation scheme in different sectors,
wherein the partitions of subchannels configured in accordance with the distributed subcarrier permutation scheme utilize interfering subcarriers in different sectors, and
wherein the partitions of subchannels configured in accordance with the distributed subcarrier permutation scheme are operable in either PUSC or FUSC modes.

9. The base station of claim 8 wherein the subchannel configuror configures N−1 partitions of subchannels in accordance with the distributed subcarrier permutation scheme and one partition of subchannels in accordance with the contiguous subcarrier permutation scheme for use within each sector of the base station, and
wherein N corresponds to a number of sectors provided by the base station and ranges between three and ten inclusive.

10. The base station of claim 8 wherein the base station further comprises physical layer circuitry to concurrently transmit downlink subframes within each sector,
wherein each downlink subframe comprises a plurality of zones comprising groups of orthogonal frequency division multiple access (OFDMA) symbols, and
wherein the subchannel configuror configures one or more partitions of subchannels in accordance with the contiguous subcarrier permutation scheme within each zone, and configures the remaining partitions of the subchannel in accordance with the distributed subcarrier permutation scheme within each zone.

11. The base station of claim 10 wherein the downlink subframe comprises an additional zone, and wherein the subchannel configuror configures most or all subchannels in the additional zone in accordance with either the contiguous subcarrier permutation scheme or the distributed subcarrier permutation scheme.

12. A sectorized wireless communication network comprising a plurality of base stations, each base station supporting communications within a cell and each cell being divided into a plurality of geographically-distinct sectors,
wherein each base station includes a controller to configure partitions of subchannels of a plurality of partitions for concurrent use in each of the sectors of the base station such that each sector has one partition of subchannels configured in accordance with a contiguous subcarrier permutation scheme for communications and each sector has remaining partitions of subchannels configured in accordance with a distributed subcarrier permutation scheme for communications,
wherein the controller is configured to coordinate the partitions of subchannels with the other base stations such that:
each sector of any particular base station has a different partition of subchannels that is configured in accordance with the contiguous subcarrier permutation scheme, and
adjacent sectors of different ones of the base stations are configured to concurrently use the different partitions of subchannels that are configured in accordance with the contiguous subcarrier permutation scheme.

13. The network of claim 12 wherein the base stations concurrently transmit downlink subframes within each sector,
wherein each downlink subframe comprises a plurality of zones comprising groups of orthogonal frequency division multiple access (OFDMA) symbols,
wherein the base stations each configure one or more partitions of subchannels in accordance with the contiguous subcarrier permutation scheme within each zone, and each configure other partitions of the subchannel in accordance with the distributed subcarrier permutation scheme within each zone.

* * * * *